United States Patent
Sy et al.

(10) Patent No.: US 11,111,702 B2
(45) Date of Patent: Sep. 7, 2021

(54) RECHARGEABLE DOOR UNLOCK ACTUATOR

(71) Applicant: ZF ACTIVE SAFETY AND ELECTRONICS US LLC, Livonia, MI (US)

(72) Inventors: Williamson S. Sy, Oak Park, MI (US); Daxesh Patel, Livonia, MI (US); Keith Miciuda, Gross Pointe Park, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 0 days.

(21) Appl. No.: 16/571,730

(22) Filed: Sep. 16, 2019

(65) Prior Publication Data
US 2020/0087954 A1   Mar. 19, 2020

Related U.S. Application Data

(60) Provisional application No. 62/733,119, filed on Sep. 19, 2018.

(51) Int. Cl.
| | |
|---|---|
| *E05B 81/80* | (2014.01) |
| *B60R 25/24* | (2013.01) |
| *B60R 25/40* | (2013.01) |
| *B60R 16/033* | (2006.01) |

(52) U.S. Cl.
CPC .............. *E05B 81/80* (2013.01); *B60R 25/24* (2013.01); *B60R 25/403* (2013.01); *B60R 16/033* (2013.01)

(58) Field of Classification Search
CPC ....... E05B 81/80; B60R 25/24; B60R 25/403; B60R 16/033
See application file for complete search history.

(56) References Cited

U.S. PATENT DOCUMENTS

| | | | | |
|---|---|---|---|---|
| 5,547,208 | A  * | 8/1996 | Chappell ................. | H02J 9/061 180/281 |
| 9,242,618 | B2 * | 1/2016 | Kawai ...................... | B60R 25/24 |
| 2006/0226960 | A1 * | 10/2006 | Pisz ....................... | G08B 25/001 340/425.5 |
| 2009/0312899 | A1 * | 12/2009 | Mitchell .............. | G08G 1/0104 701/31.4 |
| 2016/0059826 | A1 * | 3/2016 | Krishnan ................. | G07C 9/20 340/5.6 |
| 2016/0060909 | A1 * | 3/2016 | Krishnan ................ | E05B 81/86 292/194 |
| 2016/0236639 | A1 * | 8/2016 | Kobayashi .......... | B60R 21/0136 |
| 2016/0340940 | A1 * | 11/2016 | Krishnan ........... | G07C 9/00309 |

* cited by examiner

*Primary Examiner* — Thomas D Alunkal
(74) *Attorney, Agent, or Firm* — Tarolli, Sundheim, Covell & Tummino LLP

(57) ABSTRACT

A vehicle remote keyless entry system for an electrically actuatable vehicle lock includes a fob comprising a transmitter that is actuatable to transmit an RKE message. A vehicle-based receiver receives the RKE message. A vehicle-based controller operatively connected to the vehicle-based receiver is configured to supply electrical power from a vehicle battery to the vehicle lock to unlock the vehicle lock in response to receiving the RKE message from the vehicle-based receiver. An energy storage device, separate from the vehicle battery, supplies electrical power to actuate the vehicle lock to unlock the vehicle lock when predetermined conditions are met.

10 Claims, 4 Drawing Sheets

RECHARGEABLE DOOR UNLOCK ACTUATOR

RELATED APPLICATION

This application claims the benefit of U.S. Provisional Patent Application Ser. No. 62/733,119, filed on Sep. 19, 2018, the disclosure of which is entirely incorporated herein by reference.

TECHNICAL FIELD

The present invention relates to a keyless entry system for a vehicle.

BACKGROUND

Remote keyless entry ("RKE") systems, in which a key fob or key includes an RF transmitter which is used to communicate with a corresponding receiver in the vehicle to lock or unlock the vehicle doors have proved to be a very popular option for motor vehicles. Initially, these systems required a pushbutton or other actuator on the key fob to be actuated in order to lock or unlock the doors of the vehicle. These systems typically include a physical key used to engage/disengage the vehicle ignition during vehicle operation. The physical key also serves as a backup to allow for locking/unlocking the vehicle without the keyless fob.

Subsequently, passive keyless entry systems have been devised in which no user interaction with the key fob is required in order to unlock or lock the doors of the vehicle when the user is close to the vehicle. Such systems cause the doors to be unlocked when a paired fob is detected within a predetermined vicinity of the vehicle. Additionally, the passive keyless entry system provides pushbutton engage/disengage functionality of the vehicle ignition during vehicle operation once the operator and fob are detected in the vehicle.

Additionally, keyless entry systems can be configured to communicate wirelessly with smartphones, e.g., via an internet or Bluetooth. Smartphone interfaces can, for example, be used to unlock the vehicle when the keys are missing or locked inside the vehicle. Smartphones could also potentially be used and could function as the transponder in a passive keyless entry system.

Regardless of the implementation, keyless entry systems rely on electromechanical door lock actuators to actuate the mechanical door locks in response to the wireless commands. Utilizing electrically powered devices such as motors, solenoids, linear actuators, etc., the door lock actuators draw on vehicle battery power to energize the device in response to the RKE command.

SUMMARY

A vehicle remote keyless entry system for an electrically actuatable vehicle lock includes a fob comprising a transmitter that is actuatable to transmit an RKE message. A vehicle-based receiver receives the RKE message. A vehicle-based controller operatively connected to the vehicle-based receiver is configured to supply electrical power from a vehicle battery to the vehicle lock to unlock the vehicle lock in response to receiving the RKE message from the vehicle-based receiver. An energy storage device, separate from the vehicle battery, supplies electrical power to actuate the vehicle lock to unlock the vehicle lock when predetermined conditions are met.

According to one aspect, the predetermined conditions can include at least one of a vehicle crash, a battery loss, and a dead battery.

According to another aspect, alone or in combination with any other aspect, the energy storage device can be is operatively connected to the vehicle-based controller and can be configured to supply the electrical power to the vehicle-based controller. The vehicle-based controller can be configured to utilize the electrical power supplied by the energy storage device to actuate a lock actuator, which actuates the vehicle lock.

According to another aspect, alone or in combination with any other aspect, the energy storage device can be operatively connected to a lock actuator for the vehicle lock.

According to another aspect, alone or in combination with any other aspect, the energy storage device can include an energy storage device (ESD) controller and a rechargeable power supply. The ESD controller can be configured to control charging of the power supply and to control discharge of electrical power form the power supply to actuate the vehicle lock in response to the predetermined conditions being met.

According to another aspect, alone or in combination with any other aspect, the ESD controller can be configured to communicate with the vehicle-based controller to receive indication that the predetermined conditions have been met.

According to another aspect, alone or in combination with any other aspect, the ESD controller can be configured to communicate with a vehicle safety system controller to receive indication that a vehicle crash has occurred.

According to another aspect, alone or in combination with any other aspect, the communication between the ESD controller and the vehicle safety system can be direct and free from intermediate communication with the vehicle-based controller.

According to another aspect, alone or in combination with any other aspect, the energy storage device can also include an energy harvesting device for charging the power supply.

According to another aspect, alone or in combination with any other aspect, the ESD controller can be operatively connected to the energy harvesting device to regulate charging the power supply.

According to another aspect, alone or in combination with any other aspect, the ESD controller can be configured to communicate wirelessly with at least one of the vehicle-based controller and a vehicle safety system.

BRIEF DESCRIPTION OF THE DRAWINGS

Embodiments of the invention will now be described, by way of example only, with reference to the accompanying drawings, in which.

DESCRIPTION

Figure 1:
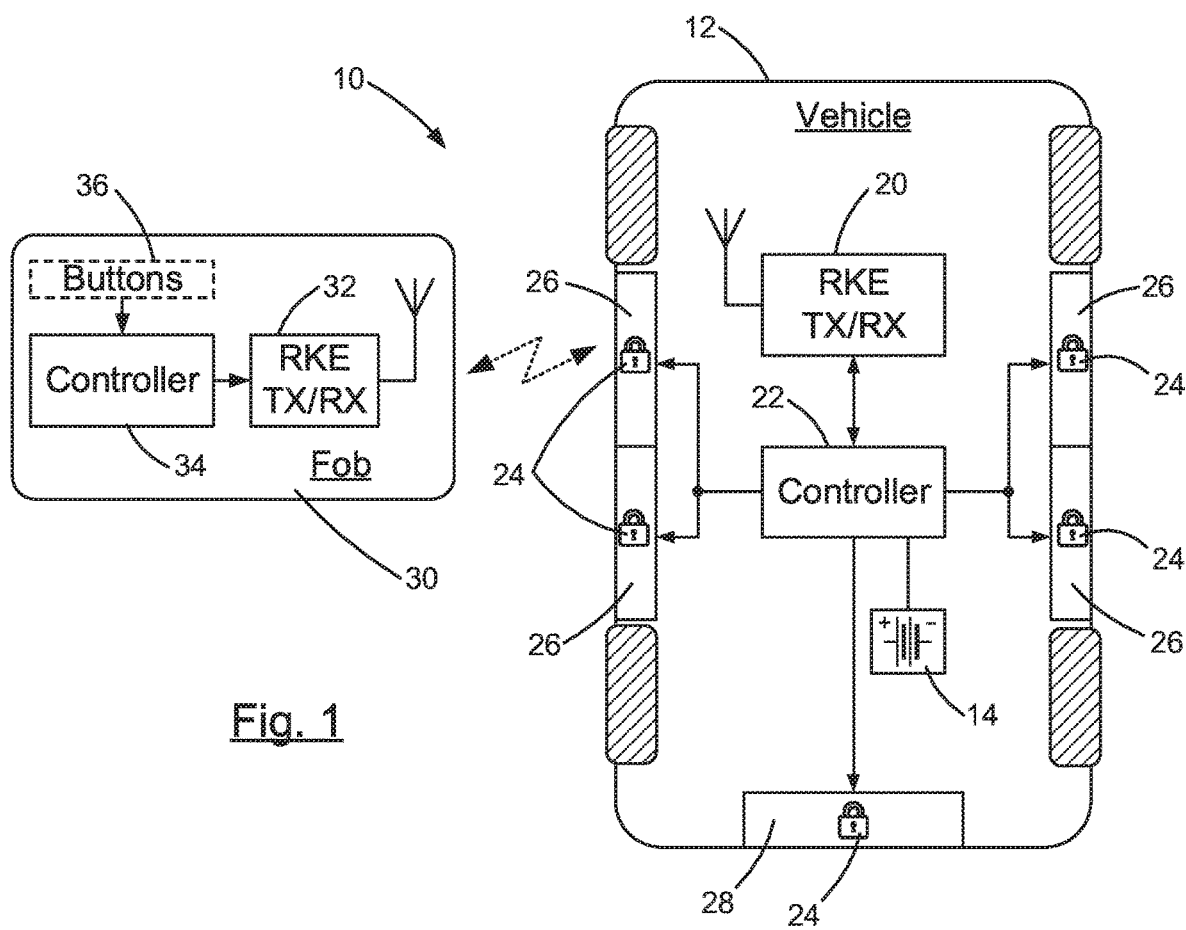
FIG. 1 illustrates a vehicle including an RKE system.

FIG. 1 illustrates schematically a vehicle remote keyless entry ("RKE") system 10 implemented in a vehicle 12. The system 10 includes a vehicle-based RKE receiver or transceiver 20 (depending on the configuration) that is operatively connected to a controller 22. For simplicity, element 20 is referred to herein generically as a transceiver, as whether it transmits and/or receives an RKE signal depends on the particular RKE system type, i.e., active, passive, etc.

The controller 22 is operatively connected to the vehicle battery 14. The controller 22 is also operatively connected to locks 24 of vehicle side entry doors 26 and rear access doors 28, such as a trunk lid, hatchback, or rear door. More specifically, each lock 24 includes or has associated with it a lock actuator 40 to which the controller 22 is operatively connected. The controller 22 can, for example, be a body control module ("BCM") of the vehicle 12. The controller 22 is operable to actuate the locks 24 in response to signals received from the RKE transceiver 20.

The system 10 also includes a fob 30 that communicates wirelessly with the vehicle-based components, specifically the RKE transceiver 20. The fob 30 includes an RKE transmitter or transceiver 32 (depending on the configuration) that is operatively connected to a controller 34. For simplicity, element 32 is referred to herein generically as a transceiver, as whether it transmits and/or receives an RKE signal depends on the particular RKE system type, i.e., active, passive, etc.

The fob 30 can also include pushbuttons 36 actuatable by a user to issue a vehicle lock/unlock command. In an active RKE system, the lock/unlock command can be initiated by the controller 34 in response to the user's actuating the pushbuttons 36. In a passive RKE system, in addition to pushbutton actuation, the lock/unlock command can be initiated by the controller 34 in response to the proximity of the fob 30 to the vehicle 12.

Figure 2:
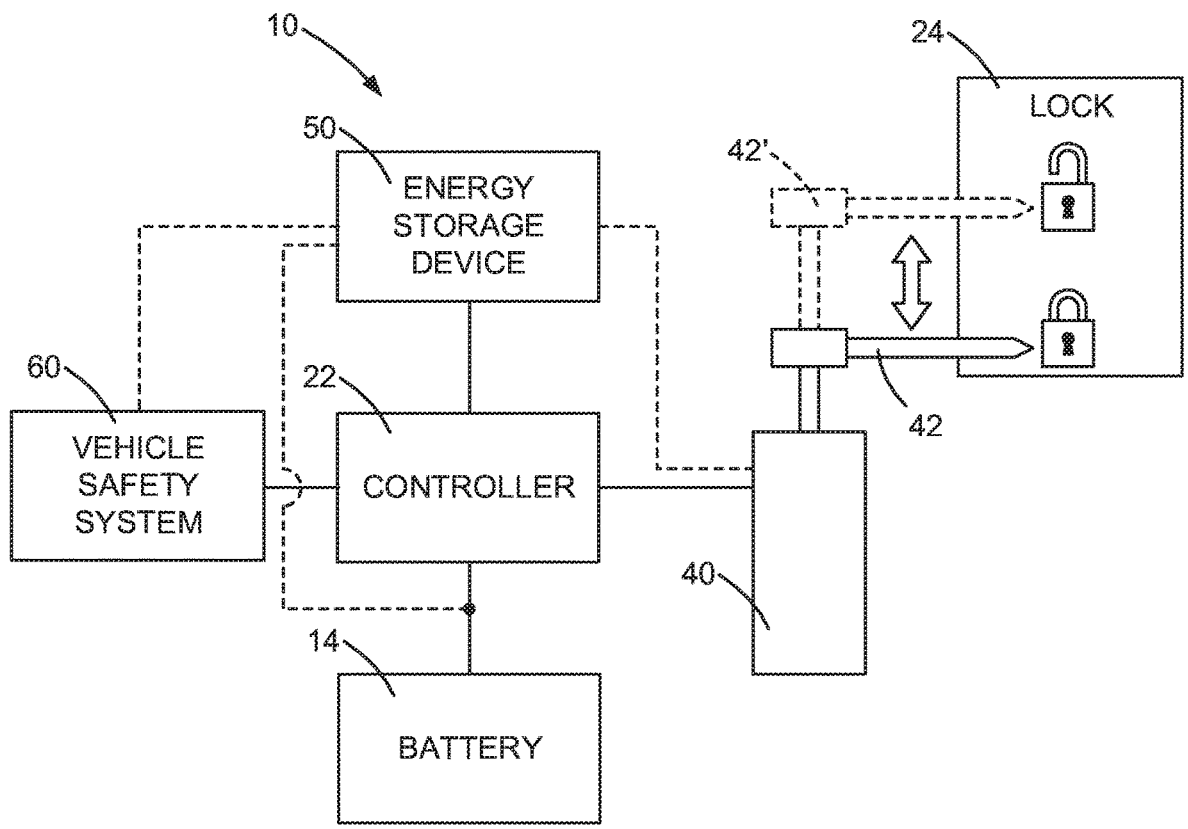
FIG. 2 illustrates an RKE system with a rechargeable door unlock actuator, according to an example configuration.

Referring to the example RKE system 10 configuration of FIG. 2, the controller 22 is operatively connected to a lock actuator 40. For any given vehicle, there can be a lock actuator 40 associated with each lock on the vehicle. For the example vehicle configuration of FIG. 1, the vehicle 12 can include a lock actuator 40 for the locks 24 of the side doors 26 and rear door 28.

The lock actuator 40 can be any electrically powered actuating device that can be configured to actuate a vehicle lock 24. For example, the lock actuator 40 can include a solenoid, a linear actuator, or an electric motor. The actuator 40 is operatively connected to the vehicle lock 24 in a known manner, e.g., via a linkage 42. The specific configurations of the actuator 40 and the linkage 42 are not critical to the operation of the RKE system 10 and are therefore illustrated schematically in FIG. 2.

The actuator 40 is actuatable to place the lock 24 in a locked condition (illustrated generally in solid lines at 42) or an unlocked condition (illustrated generally in dashed lines at 42'). The actuator 40 receives the lock/unlock signal from the controller 22. Since the actuator 40 is a "dumb" device, this actuation signal can simply be electrical power supplied to the actuator. For example, where the actuator 40 has a solenoid configuration, the actuation signal can simply be electrical power supplied to a solenoid coil with the proper polarity.

The RKE system 10 also includes an energy storage device 50 that is operatively connected to the controller 22. The energy storage device 50 can be any device capable of storing an electric charge sufficient to actuate the vehicle locks 24. The energy storage device 50 can, for example, include a rechargeable Li-Ion battery, thin-film battery, super capacitor, conventional capacitor, or other chargeable energy storage device.

The energy storage device 50 stores electrical energy that can be used to supply power to the lock actuator 40 to actuate the vehicle lock 24 in a scenario where battery power is lost. This may be the case, for example, as a result of a vehicle crash, a battery loss (e.g., due to a short circuit), or in a dead battery situation. In a crash or battery loss scenario, an automatic unlocking of the locks 24 may be desired. In a dead battery scenario, a wireless unlock via smartphone or an or some other wireless feature, such as satellite radio communication, may be desired.

In the example configuration of the RKE system 10 shown in FIG. 2, the connection between the energy storage device 50 and the lock actuator 40 is through the controller 22. The energy storage device 50 could, however, have a direct connection to the lock actuator 40 and/or a direct connection to the vehicle battery 14. Both of these potential configurations are illustrated in dashed lines in FIG. 2.

For the solid line configuration, the controller 22 can control charging the energy storage device 50 with electrical power from the battery 14. The controller 22 can also control the supply of power from the energy storage device 50 to the lock actuator 40 based on parameters programmed into the controller. In this manner, the energy storage device could be a "dumb" storage device under the regulation and control of the controller 22.

For the dashed line configuration, the energy storage device 50 can be a smart device that includes its own internal energy storage device controller, referred to herein as an ESD controller 52 operatively connected to a power supply 54, such as a rechargeable Li-Ion battery, thin-film battery, super capacitor, conventional capacitor, or other chargeable energy storage device. The ESD controller 52 can be connected to the vehicle safety system via hardwire, as indicated by the solid connecting line, or wirelessly, via the antenna. The wireless connection can, for example, be with an airbag electronic control unit ("ECU") which communicates with remote crash sensors, sometimes referred to as "satellite" sensors, designed to provide early crash detection.

The manner in which the RKE system 10 is configured to actuate the lock actuator 40 can depend on the scenario in which the actuation occurs. For example, in a dead battery scenario, the RKE system 10 can be used to actuate the lock actuator 40 in response to wireless commands from the fob 30 or some other wireless communication (e.g., smartphone, satellite radio). In this scenario, these commands are issued manually by the user via fob pushbutton, smartphone command, third party command via satellite radio, etc.

In a vehicle crash scenario, the RKE system 10 can be configured to issue the door unlock command automatically. For example, the unlock command can be issued in response to crash conditions detected by the on-board vehicle safety system. In one configuration, for example, the door unlock command can be issued any time an airbag deployment is triggered.

From the above, those skilled in the art will appreciate that the configuration of the RKE system 10 to account for the various battery loss scenarios is not a trivial matter. This is especially the case due to the fact that one of the battery loss scenarios involves a vehicle crash. In this scenario, the battery loss can be instantaneous. As a result, the system 10 should be configured so that battery loss can be detected and so that the door lock actuation via the energy storage device 50 can occur after the battery loss occurs.

For this reason, as shown in the example configuration of FIG. 2, the vehicle safety system 60, i.e., crash sensors, airbag controllers, etc., can be connected to the controller 22. In this configuration, the controller 22 can be configured to supply power from the energy storage device 50 to the door lock actuator 40 in response to receiving a signal indicative of a vehicle crash from the vehicle safety system 60. In this configuration, the energy storage device 50 could be utilized to power some portion of the controller 22 so that it can function to control the actuator 40 despite battery power 14 being cut-off. To provide this capability could require the energy storage device 50 to have a relatively high capacity, such as a relatively large capacitor, e.g., 60 microfarads or more.

As an alternative, the energy storage device 50 can be a "smart" device and can function independently from the controller 22. This is indicated generally by the connections shown in dashed lines in FIG. 2. The controller 22 may, however be operatively connected to the energy storage device 50 for the purpose of providing information to the energy storage device, such as the occurrence of a trigger (e.g., key fob unlock request) for actuating the door lock. This configuration is shown in greater detail in FIG. 3.

Figure 3:
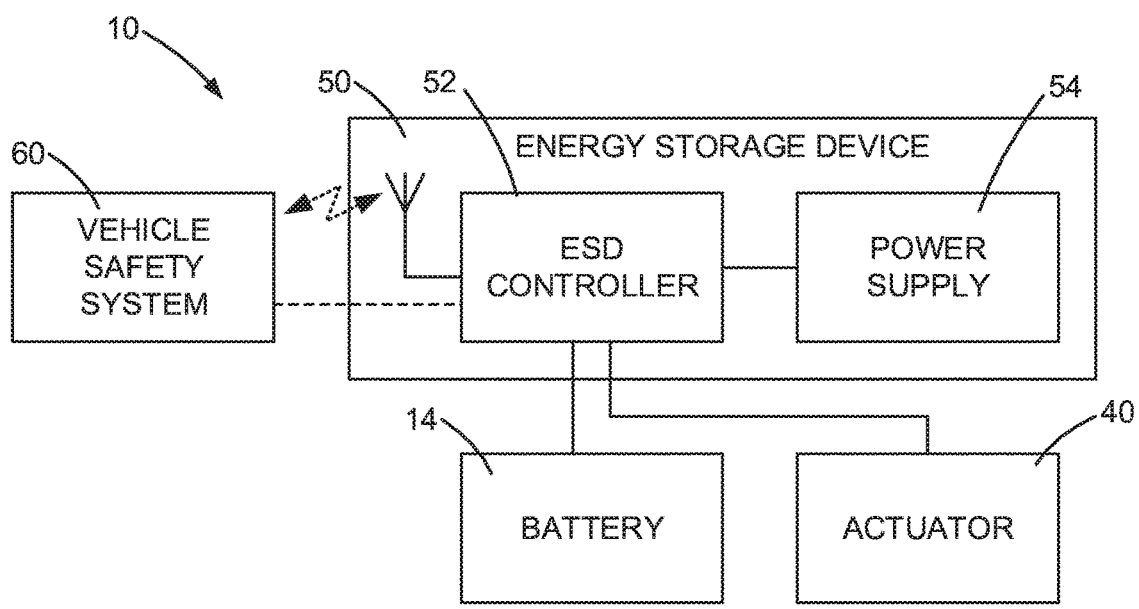
FIG. 3 illustrates a portion of the RKE system of FIG. 2.

Referring to FIG. 3, in this example configuration, the energy storage device 50 includes a dedicated ESD controller 52, which can be a microcontroller for power savings. The energy storage device 50 also includes a power supply 54, such as a rechargeable Li-Ion battery, thin-film battery, super capacitor, conventional capacitor, or other chargeable energy storage device for powering the ESD controller 52. The energy storage device 50 is connected to the vehicle battery 14 and to the lock actuator 40. The energy storage device 50 can thus receive charging power from the vehicle battery 14, which can be regulated by the ESD controller 52 to charge the power supply 54. The ESD controller 52 can also utilize power stored by the power supply 54 to energize the lock actuator 40.

The energy storage device 50 of FIG. 3 is also operatively connected to the vehicle safety system 60. This connection can be wired (solid line) or wireless (antenna). The ESD controller 52 can monitor battery power and can determine if and when the battery 14 dies or becomes disconnected. The ESD controller 52 can also monitor the vehicle safety system 60 to determine the occurrence of a vehicle crash condition. The energy storage device 50 can then respond to these situations appropriately. For example, the energy storage device 50 can unlock the doors in response to a vehicle crash. As another example, the energy storage device 50 can await an unlock command in response to a dead or disconnected battery 14. Such an unlock command can, for example, be issued through a smartphone using wireless, e.g., Bluetooth, communications.

The example configuration of FIG. 3 advantageously eliminates the need for the energy storage device to power the controller 22, which can help save power and therefore reduce the required size/capacity of the power supply 54. Since the energy storage device 50 is dedicated solely to actuating the door locks 24 in the battery loss/vehicle crash scenarios, the ESD controller 52 can be correspondingly small or less powerful than the vehicle BCM controller 22. The power supply 54 can therefore be specifically sized and specified to perform this limited number of tasks.

Figure 4:
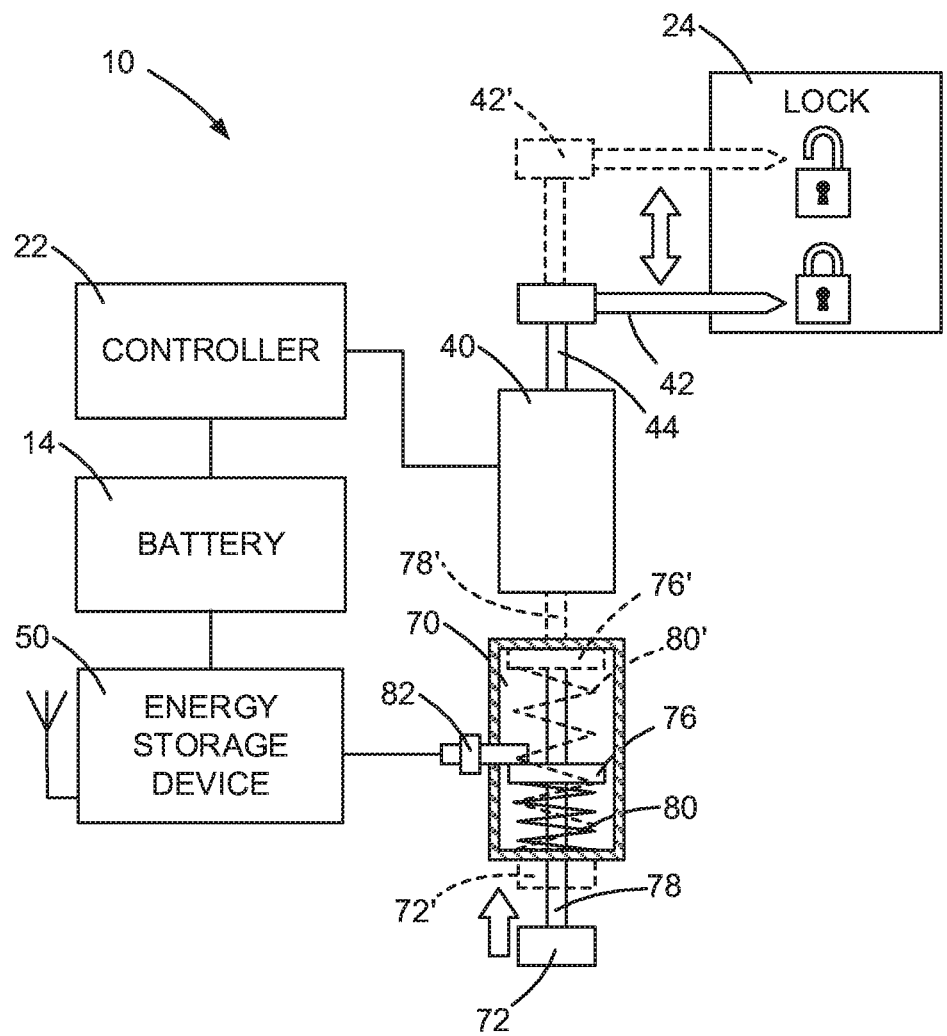
FIG. 4 illustrates an RKE system with a rechargeable door unlock actuator, according to another example configuration.

Another example configuration of the RKE system 10 is shown in FIG. 4. In this configuration, the RKE system 10 includes a mechanical actuator 70 that mechanically actuates the door lock actuator 40. The mechanical actuator 70 has stored mechanical energy that is released upon actuation to, in turn, actuate the door lock actuator 40. In this configuration, instead of the energy storage device 50 providing electrical energy directly to the lock actuators 24, it provides electrical energy for releasing the mechanical energy stored by the mechanical actuator 70.

Advantageously, as described below, a comparatively small amount of force is required to release this mechanical energy. This advantage is realized due to the fact that the small amount of force for releasing the mechanical energy can be provided via a small, low power-consuming device, which helps to reduce or minimize the required capacity of the energy storage device 50.

In the example configuration, the mechanical actuator 70 is a spring loaded device, including a spring 80 that biases a plunger 72 against a housing 74. The plunger 72 includes a shaft 76 and an element 78 connected to the shaft inside the housing 74. The spring 80 is positioned between the element 78 and the housing on a lower side of the element (as viewed in FIG. 4) and applies a spring bias that urges the plunger upward as viewed in FIG. 4.

The RKE system 10 of FIG. 4 also includes an actuator 82, such as a solenoid or linear actuator. The actuator 82 engages the plunger, specifically the element 76, and maintains the plunger in a spring loaded, non-actuated condition as indicated generally in solid lines at 72. In this non-actuated condition, the plunger is retracted, as indicated generally in solid lines at 72, the spring is compressed, as indicated generally in solid lines at 80, and the element 76 is retracted in the housing 74 and engages the actuator 82.

When the energy storage device 50 determines that unlocking the lock 24 is necessary, it actuates the mechanical actuator 70. To do so, the energy storage device 50 triggers the actuator 82, which disengages from the element 76 and releases the plunger 72. The plunger 72 moves under the bias of the spring 80 to the actuated condition, which is illustrated in dashed lines at 72' in FIG. 4. The actuated conditions of the element and spring are illustrated in dashed lines at 76' and 80', respectively.

The shaft 78 of the plunger 72 is aligned axially with the shaft 44 of the lock actuator 42. When the mechanical actuator 70 is actuated, the plunger shaft moves to the actuated position illustrated in dashed lines at 78'. The plunger shaft 78' engages the actuator shaft 44 and moves the shaft linearly to the position illustrated in dashed lines at 44'. Since the actuator shaft 44 carries the linkage 42, it moves the linkage to the position illustrated in dashed lines at 42', which unlocks the lock 24.

From the above, it will be appreciated that, due to the implementation of a mechanical actuator 70, the RKE system 10 of FIG. 4 can require comparatively little electrical actuation power. The mechanical actuator 70 supplies the comparatively large kinetic energy and mechanical force required to actuate the door lock actuator 40. The application or release of this energy/force is achieved through the actuation of a comparatively small electromechanical actuator 82. This configuration allows for the energy storage device 50 to be sized accordingly.

Figure 5:
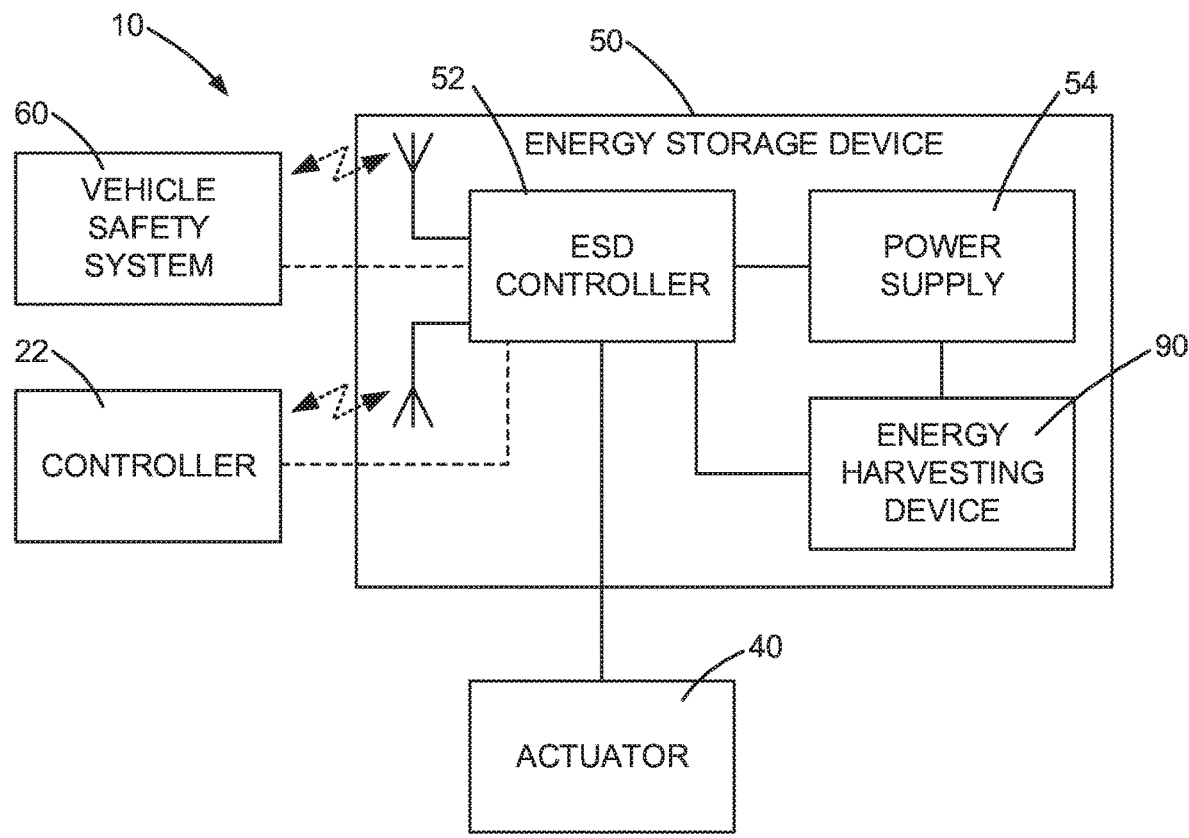
FIG. 5 illustrates a portion of an RKE system with a rechargeable door unlock actuator, according to another example configuration.

In fact, the low power consuming RKE system 10 of FIG. 4 can even be configured to operate independent from the vehicle battery 14. Referring to FIG. 5, the energy storage device 50 can include an energy harvesting device 90 for charging the power supply 54. The energy harvesting device 90 can apply a continual, albeit low-power, charge to the power supply 54. This charging can be regulated by the ESD controller 52. By a "continual charge," it is meant that, depending on the type of harvesting, the charging takes place inherently/automatically and continually whenever the harvested energy source is available. The energy storage device 50, being vehicle mounted, can employ various energy harvesting configurations and methods, individually or in combination. This can be especially advantageous in a configuration where the power supply 54 is a capacitor, since those devices are prone to leakage over time.

Generally speaking, the energy harvesting device 90 can scavenge energy from ambient motion/vibrations, wind, heat or light. The power density available from the energy harvesting device 90 depends on a variety of factors, such as the size and design of the device, and the magnitude of the energy source. For example, generally speaking, for small motion powered devices of the type implemented in the energy storage device, typical power densities can be in the range of tens or hundreds $\mu W/cm^3$ for a motion/vibration energy harvesting device.

Nevertheless, there are several energy harvesting configurations and methods that can be implemented in the energy harvesting device 90. The energy harvesting device 90 could, for example be configured to harvest power through magnetic induction. In this implementation, permanent magnets can be configured to move relative to a conductive coil to induce an electric current in the coil, which can be used to charge the power supply 54. In this configuration, the energy harvesting device 90 can be arranged so that vehicle motion or vibration moves the magnet relative to the coil to produce the charging current.

Piezoelectric energy harvesting devices include piezoelectric crystals or fibers that generate a voltage whenever they are mechanically deformed. Automobile vibrations, such as engine vibrations or road vibrations can stimulate piezoelectric materials, causing them to produce an electric current. The energy harvesting device 90 can include piezoelectric elements that generate electrical current in this manner.

The energy harvesting device 90 could also include special antennas that can collect energy from stray radio waves and other ambient electromagnetic radiation.

The energy harvesting device 90 could also include photovoltaic cells that convert solar radiation into electrical current. Photovoltaic light harvesting device can provide relatively higher power densities, but also require direct exposure to light/sunlight, and require a larger footprint.

The energy harvesting device 90 could also include a thermoelectric generator, in which the junction of two dissimilar materials in the presence of a thermal gradient generates a small electrical current. Electrical energy can be harvested by linking multiple junctions electrically in series and thermally in parallel. Heat is abundantly available in a vehicle, e.g., in the engine compartment, so this device, coupled, perhaps, with a heat sink to improve the temperature gradient, can be used.

What is claimed is:

1. A vehicle remote keyless entry system for an electrically actuatable vehicle lock, comprising:
   a fob comprising a transmitter that is actuatable to transmit an RKE message;
   a vehicle-based receiver for receiving the RKE message;
   a vehicle-based controller operatively connected to the vehicle-based receiver, the vehicle-based controller being configured to supply electrical power from a vehicle battery to the vehicle lock to unlock the vehicle lock in response to receiving the RKE message from the vehicle-based receiver; and
   an energy storage device separate from the vehicle battery, the energy storage device comprising an ESD controller and a power supply, wherein the ESD controller is configured to communicate with a vehicle safety system controller to receive indication that a vehicle crash has occurred, and wherein the ESD controller is configured to control the power supply to provide electrical power to actuate the vehicle lock to automatically unlock the vehicle lock in response to receiving the indication that a vehicle crash has occurred and without receiving an RKE message.

2. The vehicle remote keyless entry system recited in claim 1, wherein the energy storage device is operatively connected to the vehicle-based controller and is configured to supply the electrical power to the vehicle-based controller, and wherein the vehicle-based controller is configured to utilize the electrical power supplied by the energy storage device to actuate a lock actuator, which actuates the vehicle lock.

3. The vehicle remote keyless entry system recited in claim 1, wherein the energy storage device is operatively connected to a lock actuator for the vehicle lock.

4. The vehicle remote keyless entry system recited in claim 1, wherein the ESD controller is further configured to control charging of the power supply.

5. The vehicle remote keyless entry system recited in claim 1, wherein the communication between the ESD controller and the vehicle safety system is direct and free from intermediate communication with the vehicle-based controller.

6. The vehicle remote keyless entry system recited in claim 1, wherein the energy storage device further comprises an energy harvesting device for charging the power supply.

7. The vehicle remote keyless entry system recited in claim 6, wherein the ESD controller is operatively connected to the energy harvesting device to regulate charging the power supply.

8. The vehicle remote keyless entry system recited in claim 1, wherein the ESD controller is configured to communicate wirelessly with at least one of the vehicle-based controller and a vehicle safety system.

9. The vehicle remote keyless entry system recited in claim 1, wherein the ESD controller is configured to automatically unlock the vehicle lock in direct response to receiving the indication that a vehicle crash has occurred.

10. The vehicle remote keyless entry system recited in claim 1, wherein the ESD controller is configured to automatically unlock the vehicle lock without intervention by a user of the fob.

* * * * *